US008387869B2

(12) United States Patent
Shah et al.

(10) Patent No.: US 8,387,869 B2
(45) Date of Patent: Mar. 5, 2013

(54) PROTECTING ELECTRONIC CARDS

(75) Inventors: Dhaval K. Shah, Guajarat (IN); Gaurav Chhaunker, Hyderabad (IN); Vikram B. Sanap, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 12/647,107

(22) Filed: Dec. 24, 2009

(65) Prior Publication Data

US 2011/0155802 A1 Jun. 30, 2011

(51) Int. Cl.
*G06K 5/00* (2006.01)
(52) U.S. Cl. .......................................... 235/380; 235/379
(58) Field of Classification Search .................. 235/379, 235/380, 492
See application file for complete search history.

(56) References Cited

U.S. PATENT DOCUMENTS

| | | | |
|---|---|---|---|
| 6,185,507 B1 | 2/2001 | Huber et al. | |
| 6,400,270 B1 * | 6/2002 | Person | 340/568.7 |
| 6,591,249 B2 | 7/2003 | Zoka | |
| 6,636,833 B1 | 10/2003 | Flitcroft et al. | |
| 6,641,050 B2 | 11/2003 | Kelley et al. | |
| 6,954,133 B2 | 10/2005 | McGregor et al. | |
| 7,210,621 B2 | 5/2007 | Woronec | |
| 7,383,988 B2 | 6/2008 | Slonecker, Jr. | |
| 7,533,828 B2 | 5/2009 | Ong | |
| 7,536,721 B2 * | 5/2009 | Stevens et al. | 726/17 |
| 2002/0087869 A1 | 7/2002 | Kim | |
| 2005/0075985 A1 | 4/2005 | Cartmell | |
| 2005/0165683 A1 * | 7/2005 | Taylor | 705/44 |
| 2009/0184164 A1 | 7/2009 | Sparks | |
| 2009/0298543 A1 | 12/2009 | Willemin | |

FOREIGN PATENT DOCUMENTS

WO 2006017165 A2 2/2006

OTHER PUBLICATIONS

Washington Metro Area Transit Authority SmartTrip technical specification, May 30, 1997, as released at http://www.epic.org/foia_notes/wmata.pdf.*

(Continued)

*Primary Examiner* — Daniel Hess
(74) *Attorney, Agent, or Firm* — Lieberman & Brandsdorfer, LLC

(57) ABSTRACT

A device, a system, and methods of securing an authentication device are disclosed. A security system includes an authentication device configured for transmitting a second signal to deactivate the authentication device, in response to receiving a first signal. The authentication device further includes a receiver, a transmitter, an activation device, and a power source, and wherein the second signal includes a unique identifier of the authentication device. The security system further includes an authentication device reader configured for receiving the second signal from the authentication device, extracting the unique identifier from the second signal, and transmitting the extracted unique identifier. The security system further includes an identification data management system configured for storing stored unique identifiers corresponding to authentication devices, storing validity status indicators corresponding to the stored unique identifiers, validating a transaction of the at least one authentication device in response to a combination of the corresponding stored unique identifier and the corresponding validity status indicator, receiving the extracted unique identifier from the authentication device reader, matching the extracted unique identifier with the plurality of stored unique identifiers, and deactivating the authentication device corresponding to the at least one matched stored unique identifier, wherein the deactivation is performed by modifying the corresponding validity status indicator, if a match is found between the extracted unique identifier and at least one stored unique identifier. Also disclosed are a device and methods for securing the authentication device.

13 Claims, 5 Drawing Sheets

OTHER PUBLICATIONS

"Metro History" article at http://www.wmata.com/about_metro/docs/history.pdf, captured Jul. 7, 2010.*

Anne Bliss, Ph.D., "Technology and Privacy in the New Millennium", Program for Writing and Rhetoric, University of Colorado at Boulder, Dec. 2004—http://www.ethicapublishing.com/PrivacyandTechnology.pdf.

Petteri Alahuhta, "Safeguards in a World of Ambient Intelligence (SWAMI)" Michael Friedewald, Fraunhofer Institute for Systems and Innovation Research, Breslauer Straβe, 76139 Karlsruhe, Germany, —http://is.jrc.ec.europa.eu/pages/TFS/documents/SWAMI_D2_scenarios_Final_ESvf_003.pdf, 2005.

"Prime: Privacy and Identity Management for Europe", Jun. 15, 2005—https://www.prime-project.eu/prime_products/reports/fmwk/pub_del_D14.0.a_ec_wp14.0_V6_final.pdf.

"Methods of identity theft and a procedure to carry out in case of financial card theft" Copyright 2007 © TheCreditTruth.org—http://www.thecredittruth.org/id-theft.aspx.

"Procedure to follow in case card is stolen" Jun. 2002—http://www.ftc.gov/bcp/edu/pubs/consumer/credit/cre04.shtm.

* cited by examiner

PROTECTING ELECTRONIC CARDS

BACKGROUND OF THE INVENTION

Use of electronic cards is increasing rapidly and is gaining widespread acceptance by people. There are many types of electronic cards, such as, for example, an electronic credit card, an electronic debit card, an electronic financial card and an electronic identification card. Electronic credit cards are used extensively as they provide flexibility of use for multiple purposes and users don't have to physically carry large amount of cash, which can be risky.

Recent innovations have brought significant security-related advances to the electronic cards and consumer banking industries. In the 1980s, holographic images were introduced and included on plastic card faces to deter the manufacture of counterfeit cards. More recently, some cards have been configured to include a photograph of the authorized user, thereby obviating the need for a purchaser to present separate identification and decreasing the likelihood of fraud. More recently, smart cards, also known as personal data cards or chip cards, which include a memory chip integral with the card, now provide additional security features.

SUMMARY OF THE INVENTION

Principles of the embodiments of the invention are directed to a device, a system, and methods of securing an authentication device. Accordingly, embodiments of the invention disclose an authentication device configured to transmit a second signal to deactivate the authentication device, in response to receiving a first signal by the authentication device.

The authentication device is one of an electronic credit card, an electronic debit card, an electronic financial card, and an electronic identification card. The second signal is a wireless signal and is one selected from a group of a radio frequency identification signal, an optical signal, an audio signal, a magnetic signal, an electromagnetic signal, and an infra-red signal. The authentication device includes a receiver that is configured to receive the first signal and transmit an input signal to an activation device. The activation device is configured to receive the input signal and produce an activation signal. The authentication device further includes a power source configured to provide energy to the activation device. The authentication device further includes a transmitter configured to receive the activation signal from the activation device and transmit the second signal to deactivate the authentication device. The second signal includes a unique identifier corresponding to the authentication device.

A further embodiment of the invention discloses the security system including the authentication device, and further includes an authentication device reader configured to interact with the authentication device, receive the second signal from the transmitter of the authentication device, and extract the unique identifier from the second signal. The authentication device reader is further configured to receive a communication from a user and abandon transmission of the extracted unique identifier, in response to receiving the communication. The authentication device reader is further configured to transmit the extracted unique identifier, wherein the transmission is in response to receiving the second signal.

Embodiments of the invention further disclose the security system further including an identification data management system configured to store a plurality of stored unique identifiers corresponding to a plurality of authentication devices, store a plurality of validity status indicators corresponding to the plurality of stored unique identifiers, and validate a transaction of the at least one authentication device in response to a combination of the corresponding stored unique identifier and the corresponding validity status indicator, wherein the identification data management system is functionally coupled to the authentication device reader.

Embodiments of the invention further disclose the identification data management system being further configured to receive the extracted unique identifier from the authentication device reader, match the extracted unique identifier with the plurality of stored unique identifiers, and deactivate the authentication device corresponding to the at least one matched stored unique identifier, wherein the deactivation is performed by modifying the corresponding validity status indicator, if a match is found between the extracted unique identifier and at least one stored unique identifier.

Embodiments of the invention further disclose the identification data management system being further configured to store at least one secondary stored unique identifier corresponding to the at least one stored unique identifier, wherein the at least one secondary stored unique identifier corresponds to a secondary authentication device, and store a secondary validity status indicator corresponding to each of the secondary stored unique identifiers. If a match is found between the extracted unique identifier and the at least one stored unique identifier, the identification data management system is further configured to identify the at least one secondary stored unique identifier associated with the at least one matched stored unique identifier, and deactivate the at least one secondary authentication device, wherein the deactivation is performed by modifying the secondary validity status indicator corresponding to the at least one matched secondary stored unique identifier. Other embodiments are also disclosed.

BRIEF DESCRIPTION OF THE DRAWINGS

Embodiments of the invention are described in detail below, by way of example only, with reference to the following schematic drawings, where.

DETAILED DESCRIPTION OF THE INVENTION

Principles of the embodiments of the invention are directed to a device, a system, and methods of securing an authentication device. Recent innovations have brought significant security-related advances to the authentication devices such as electronic cards and consumer banking industries. However, many technologies are not able to eliminate potential fraud. The use of signature as a validation control may be overlooked as forged. The use of credit cards with the vendors even with security measure as the holographic image or photographs is not enough to eliminate fraud. It has been difficult to stop hackers from penetrating secure websites.

Apart from these issues with the use of electronic cards in general, the security of electronic cards or authentication devices in general becomes more relevant in less frequent but important events like a user of an authentication device being involved in an accident or being held for ransom. In case of a user having an accident in a vehicle, if the user is unconscious or dead, then it is relatively easy for criminals to misuse the electronic cards. For friends or relatives who want to deactivate the electronic cards of the owner to prevent misuse by criminals, it is difficult as the friends or relatives may not have access to all the details necessary for the deactivation to take place by the electronic card authority. Even in case of the owner of electronic card is not unconscious, for her to deactivate the authentication card is a tedious process, which typically entails calling up a number provided by the electronic card institution and providing many details to ascertain the authenticity of the user.

Figure 1:
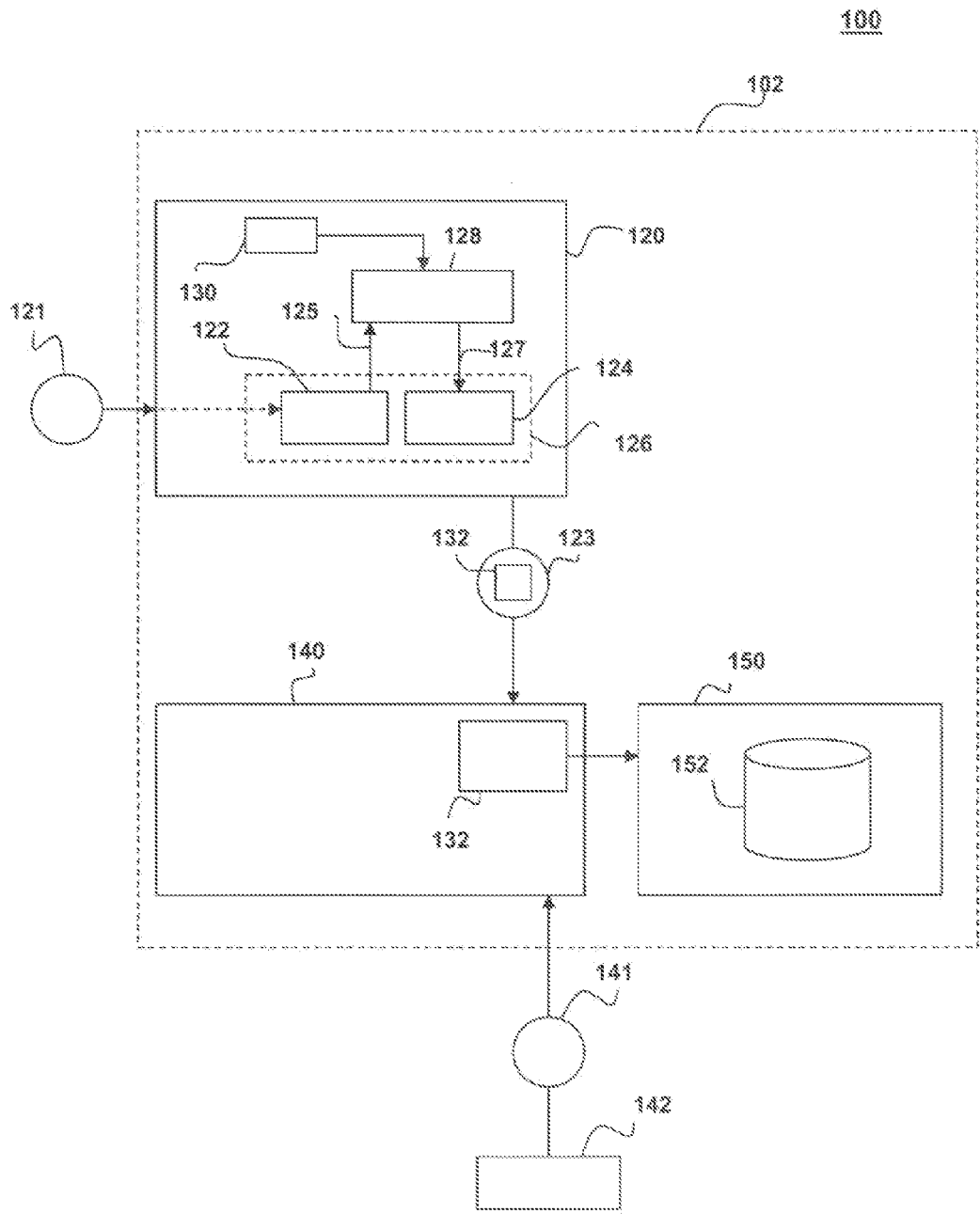
FIG. 1 shows a schematic of a security system for securing an authentication device in accordance with an example embodiment of the invention.

FIG. 1 shows a schematic 100 of a security system for securing an authentication device in accordance with an example embodiment of the invention. FIG. 1 schematic 100 depicts security system 102 shown by a dotted line, first signal 121, user 142 and communication 141. Security system 102 further includes authentication device 120, authentication device reader 140 and identification data management system 150. Authentication device 120 is one of an electronic credit card, an electronic debit card, an electronic financial card, or an electronic identification card. Authentication device 120 further includes receiver 122, activation device 128, power source 130, and a transmitter 124. Activation device 128 is communicatively coupled to power source 130, transmitter 124 and receiver 122. In an alternate configuration, receiver 122 and transmitter 124 may be combined to be just one transceiver 126, shown by a dotted box. Receiver 122 is capable of receiving first signal 121. Receiver 122 can be one of a touchpad, a button, an impact transducer, and a keypad. In one exemplary mode, when an owner of the authentication device 120 meets with an accident, the authentication device 120 is impacted. The impact is, in an exemplary mode, first signal 121, which is an external signal. Receiver 122 is configured to receive first signal 121 and transmit input signal 125 to activation device 128. Activation device 128 is one selected from a set including a microprocessor, an integrated circuit and a processor.

Activation device 128 is configured to receive input signal 125 and produce activation signal 127. Power source 130 is one selected from a group including a battery, a solar powered source, a motion based power source, and a piezoelectric source. Power source 130 is configured to provide energy to activation device 128. Transmitter 124 is one selected from an antenna and a signal generator. Transmitter 124 is configured to receive activation signal 127 from activation device 128 and transmit second signal 123 to deactivate authentication device 120. In an exemplary mode, when the credit card is impacted due to an accident, the card itself is able to send a signal to deactivate itself.

Second signal 123 is a wireless signal and is one of a radio frequency identification signal, an optical signal, an audio signal, a magnetic signal, an electromagnetic signal, and an infra-red signal. Second signal 123 includes unique identifier 132 corresponding to authentication device 120.

Security system 102 includes authentication device 120 and further includes authentication device reader 140 configured to interact with authentication device 120, receive second signal 123 from transmitter 124 of authentication device 120 and extract unique identifier 132 from second signal 123. Authentication device reader 140 is further configured to transmit extracted unique identifier 132, wherein the transmission is in response to receiving second signal 123. In an exemplary mode authentication device reader 140 is a reader fitted in a vehicle that is able to pick up signal, such as, second signal 123, and then transmit unique identifier 132 to a host computer where information about authentication device 120 is stored. Authentication device reader 140 is further configured to receive communication 141 from user 142, and abandon transmission of extracted unique identifier 132 in response to receiving communication 141. In an exemplary mode, communication 141 can be a password or a PIN that the user 142 enters to abort the transmission of extracted unique identifier.

Security system 102 further includes identification data management system 150 configured to store a plurality of stored unique identifiers corresponding to a plurality of authentication devices, store a plurality of validity status indicators corresponding to the plurality of stored unique identifiers, and validate a transaction of the at least one authentication device 120 in response to a combination of the corresponding stored unique identifier 132 and the corresponding validity status indicator, wherein the identification data management system 150 is functionally coupled to the authentication device reader 140. In an exemplary mode, database 152 is used for the storage of data. Identification data management system 150, in an exemplary mode, is a database management system DBMS that stores data about various electronic cards, in a relational database system. In an exemplary mode, identification data management system 150 is connected to authentication device reader 140 via internet.

Identification data management system 150 is further configured to receive extracted unique identifier 132 from authentication device reader 140, and match extracted unique identifier 132 with the plurality of stored unique identifiers. Identification data management system 150 is further configured to deactivate the authentication device 120 corresponding to the at least one matched stored unique identifier, wherein the deactivation is performed by modifying the corresponding validity status indicator, if a match is found between the extracted unique identifier 132 and at least one stored unique identifier. In an exemplary mode, when the electronic card is deactivated in the database by making validity status indicator to 'invalid', no transaction will be allowed thereon and the potential for fraud is reduced.

Identification data management system 150 is further configured to store at least one secondary stored unique identifier corresponding to the at least one stored unique identifier, wherein the at least one secondary stored unique identifier corresponds to a secondary authentication device, store a secondary validity status indicator corresponding to each of the secondary stored unique identifiers. In an exemplary mode, a secondary authentication device is another credit card or debit card of the same person. If a match is found between extracted unique identifier 132 and the at least one stored unique identifier, then identification data management system 150 is further configured to identify at least one secondary stored unique identifier associated with the at least one matched stored unique identifier, and deactivate the at least one secondary authentication device, wherein the deactivation is performed by modifying the secondary validity status indicator corresponding to the at least one matched secondary stored unique identifier.

In an exemplary mode, not only the original authentication device 120 will be invalidated, but also at least some of the secondary electronic cards associated with the same person will be invalidated, providing more security to the person.

In yet another exemplary mode, receiver 122 may be a button, which the owner of authentication device 120 may press. Pressing the button is first signal 121 that is able to trigger the same mechanism described in other embodiments, eventually resulting into deactivation of authentication device 120, and thus protecting the owner financially.

Figure 2:
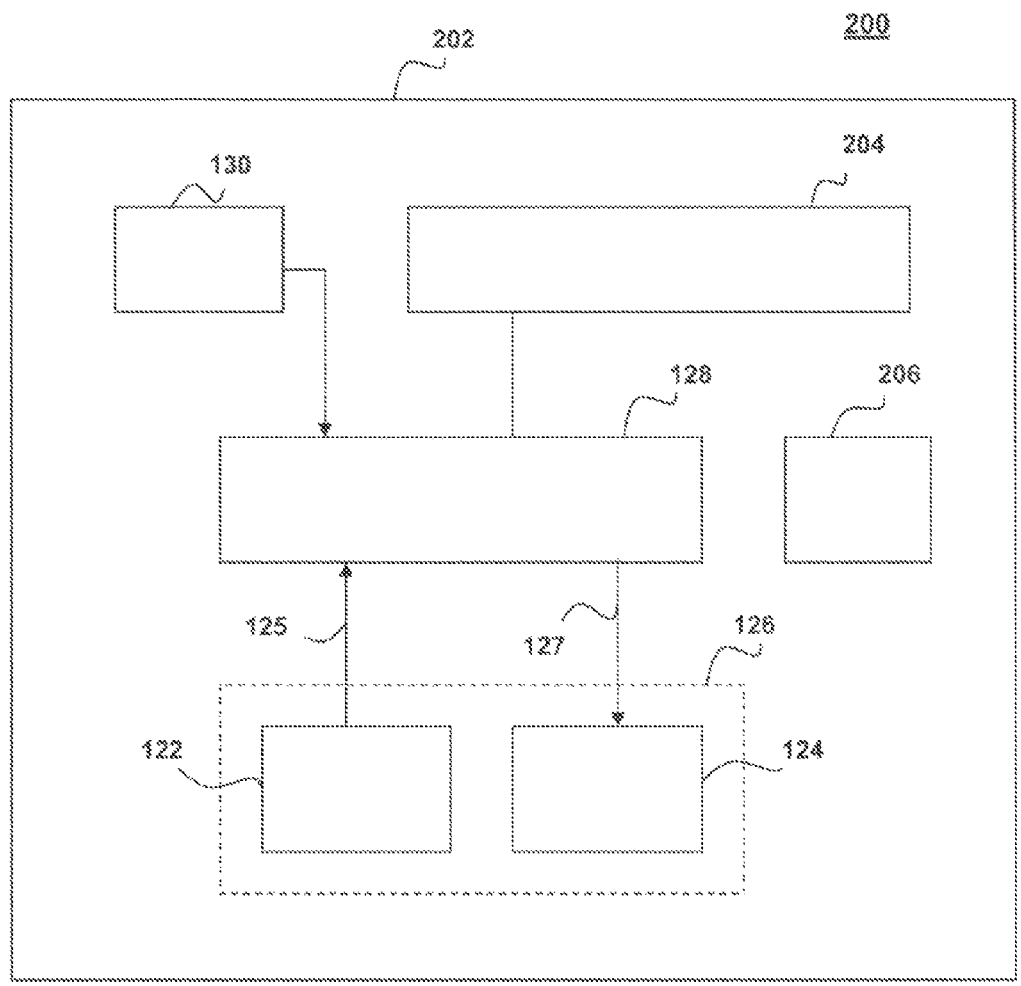
FIG. 2 shows a schematic illustrating an authentication device in accordance with an example embodiment of the invention.

FIG. 2 shows a schematic 200 illustrating an authentication device in accordance with an example embodiment of the invention. Schematic 200 depicts authentication device 202. Authentication device 202 includes all the details of authentication device 120 of FIG. 1. Authentication device 202 further includes alphanumeric display, such as an LED or LCD display 204. Authentication device 202 also includes a ROM 206 that may be used to store the fingerprint, biometric data, encryption keys, a transaction counter or any other identity or transaction related data. ROM 206 can be an EEPROM.

Figure 3:
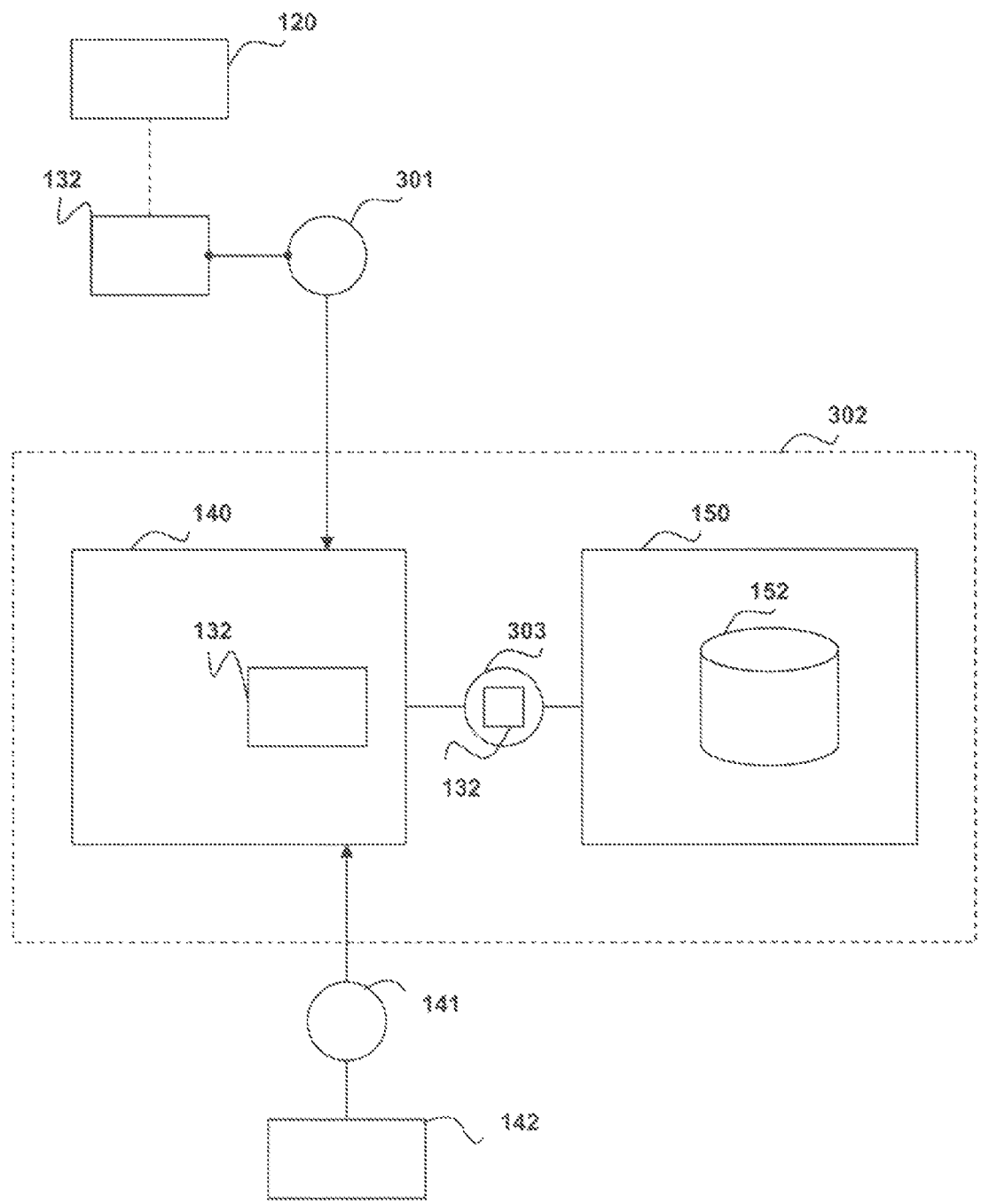
FIG. 3 shows a schematic of a security system for securing an authentication device in accordance with an alternate embodiment of the invention.

FIG. 3 shows a schematic 300 of a security system 302 for securing an authentication device 120 of FIG. 1 in accordance with an alternate embodiment of the invention. Security system 302 includes authentication device reader 140 of FIG. 1 and identification data management system 150 of FIG. 1. Authentication device reader 140 is configured to receive third signal 301, wherein third signal 301 is associated with authentication device 120 of FIG. 1 having unique identifier 132 of FIG. 1. Authentication device reader 140 is also configured to extract unique identifier 132 and transmit fourth signal 303 to deactivate authentication device 120, in response to receiving third signal 301, wherein fourth signal 303 includes extracted unique identifier 132.

In an exemplary mode, authentication device reader 140 is a reader fitted in a vehicle and is able to get a signal from a mechanism of airbag inflating in response to an accident, and authentication device reader 140 is capable of retrieving unique identifier 132 of the owner of the vehicle and presumably also of authentication device 120, which needs instant deactivation for security reasons.

Authentication device reader 140 is further configured to receive communication 141 of FIG. 1 from user 142 of FIG. 1, and abandon transmission of fourth signal 303 in response to receiving communication 141. In an exemplary mode, communication 141 can be a password or a PIN that the user 142 enters to abort the transmission of extracted unique identifier.

Security system 302 further includes identification data management system 150 of FIG. 1 configured to store a plurality of stored unique identifiers corresponding to a plurality of authentication devices, store a plurality of validity status indicators corresponding to the plurality of stored unique identifiers, and validate a transaction of the at least one authentication device 120 in response to a combination of the corresponding stored unique identifier 132 and the corresponding validity status indicator, wherein the identification data management system 150 is functionally coupled to the authentication device reader 140. In an exemplary mode, database 152 of FIG. 1 is used for the storage of data. Identification data management system 150, in an exemplary mode, is a database management system DBMS that stores data about various electronic cards, in a relational database system. In an exemplary mode, identification data management system 150 is connected to authentication device reader 140 via internet.

Identification data management system 150 is further configured to receive fourth signal 303 from authentication device reader 140, extract unique identifier 132 from fourth signal 303, and match extracted unique identifier 132 with the plurality of stored unique identifiers. Identification data management system 150 is further configured to deactivate the authentication device 120 corresponding to the at least one matched stored unique identifier, wherein the deactivation is performed by modifying the corresponding validity status indicator, if a match is found between the extracted unique identifier 132 and at least one stored unique identifier. In an exemplary mode, when the electronic card is deactivated in the database by making validity status indicator to 'invalid', no transaction will be allowed thereon and the potential for fraud is reduced.

Identification data management system 150 is further configured to store at least one secondary stored unique identifier corresponding to the at least one stored unique identifier, wherein the at least one secondary stored unique identifier corresponds to a secondary authentication device, store a secondary validity status indicator corresponding to each of the secondary stored unique identifiers. In an exemplary mode, a secondary authentication device is another credit card or debit card of the same person. If a match is found between extracted unique identifier 132 and the at least one stored unique identifier, then identification data management system 150 is further configured to identify at least one secondary stored unique identifier associated with the at least one matched stored unique identifier, and deactivate the at least one secondary authentication device, wherein the deactivation is performed by modifying the secondary validity status indicator corresponding to the at least one matched secondary stored unique identifier.

In an exemplary mode, not only the original authentication device 120 will be invalidated, but also at least some of the secondary electronic cards associated with the same person will be invalidated, providing more security to the person.

Figure 4:
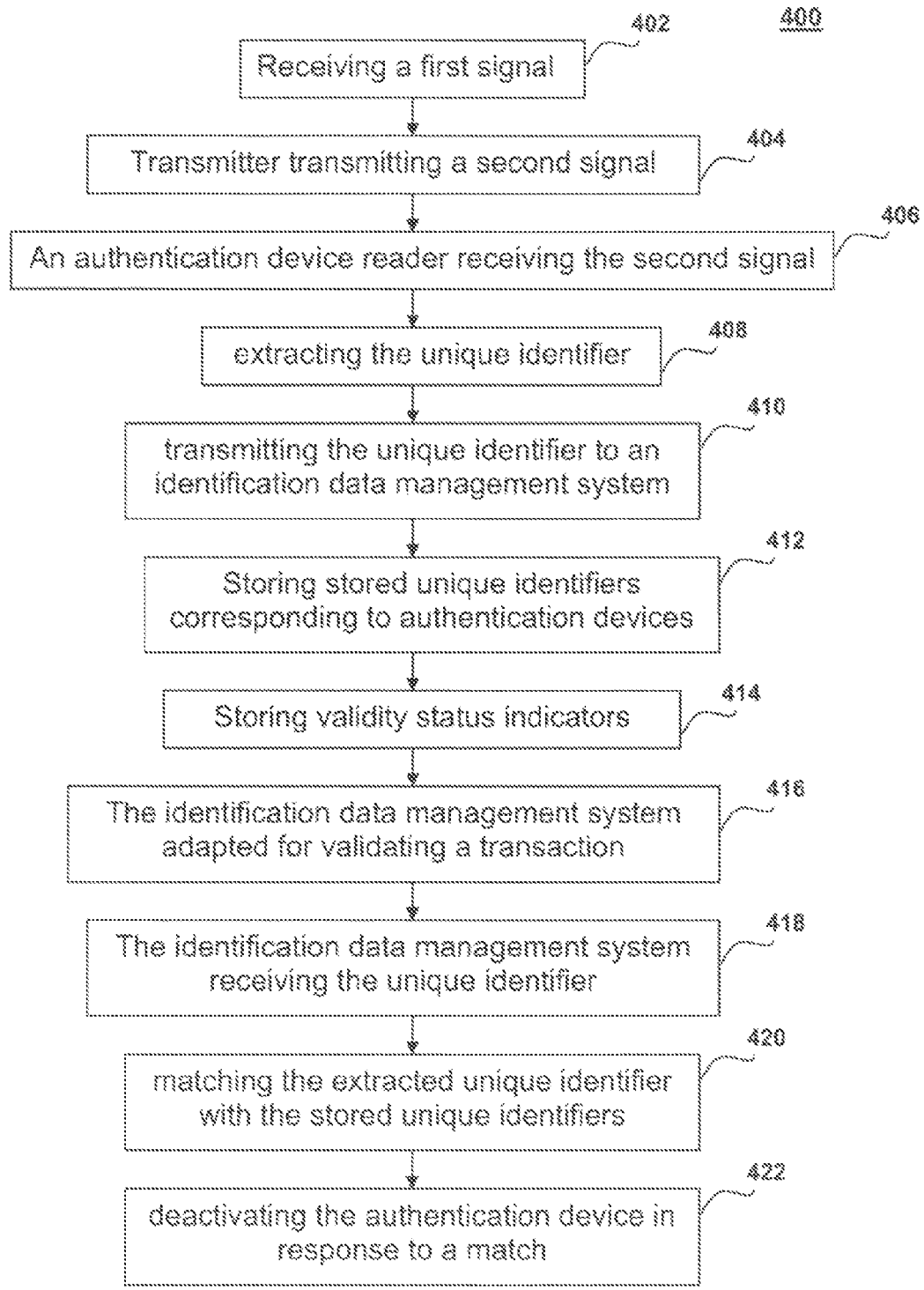
FIG. 4 shows a flow chart for securing an authentication device as disclosed in one embodiment of the invention and in accordance with the security system of FIG. 1.

FIG. 4 shows a flow chart 400 for securing an authentication device 120 of FIG. 1 as disclosed in one embodiment of the invention and in accordance with the security system 102 of FIG. 1. Flow chart 400 includes step 402 depicting receiving a first signal. Step 404 depicts transmitting a second signal to deactivate the authentication device, in response to receiving a first signal, wherein the transmitting is performed by the authentication device, and wherein the authentication device includes a receiver, a transmitter, an activation device, and a power source, and wherein the second signal includes a unique identifier of the authentication device. An authentication device reader is communicatively coupled to the authentication device. As depicted in step 406, the authentication device reader is configured for receiving the second signal from the authentication device. As depicted in step 408, the authentication device reader is configured for extracting the unique identifier from the second signal. As depicted in step 410, the authentication device reader is configured for transmitting the extracted unique identifier. An identification data management system is communicatively coupled to the authentication device reader. As depicted in step 412, the identification data management system is configured for storing a plurality of stored unique identifiers corresponding to a plurality of authentication devices.

As depicted in step 414, the identification data management system is configured for storing a plurality of validity status indicators corresponding to the plurality of stored unique identifiers. As depicted in step 416, the identification data management system is further configured for validating a transaction of the at least one authentication device in response to a combination of the corresponding stored unique identifier and the corresponding validity status indicator. As depicted in step 418, the identification data management system is configured for receiving the extracted unique identifier from the authentication device reader. As depicted in step 420, the identification data management system is configured for matching the extracted unique identifier with the plurality of stored unique identifiers. As depicted in step 422, the identification data management system is configured for deactivating the authentication device corresponding to the at least one matched stored unique identifier, wherein the deactivation is performed by modifying the corresponding validity status indicator, if a match is found between the extracted unique identifier and at least one stored unique identifier.

Figure 5:
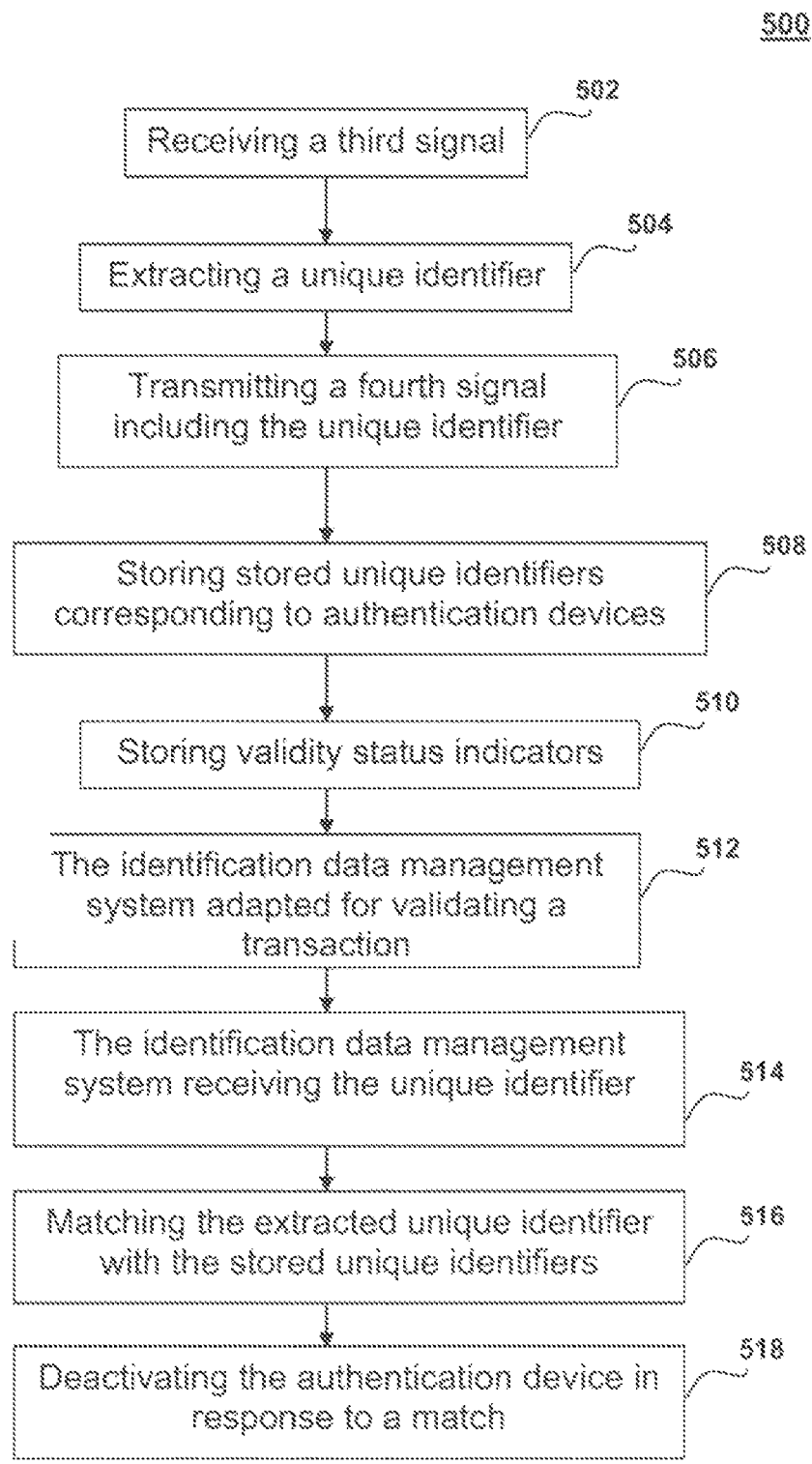
FIG. 5 shows a flow chart for securing an authentication device as disclosed in an alternate embodiment of the invention and in accordance with the security system of FIG. 3.

FIG. 5 shows a flow chart 500 for securing an authentication device 120 of FIG. 1 as disclosed in an alternate embodiment of the invention and in accordance with the security system 302 of FIG. 3. Flow chart 500 includes step 502 depicting an authentication device reader configured for receiving a third signal. The authentication device reader is communicatively coupled to the authentication device. As depicted in step 504, the authentication device reader is configured for extracting the unique identifier associated with the authentication device and step 506 depicts transmitting a fourth signal to deactivate the authentication device, in response to receiving the third signal, wherein the fourth signal includes the unique identifier. An identification data management system is communicatively coupled to the authentication device reader. As depicted in step 508, the identification data management system is configured for storing a plurality of stored unique identifiers corresponding to a plurality of authentication devices.

As depicted in step 510, the identification data management system is configured for storing a plurality of validity status indicators corresponding to the plurality of stored unique identifiers and step 512 depicts validating a transaction of the at least one authentication device in response to a combination of the corresponding stored unique identifier and the corresponding validity status indicator. As depicted in step 514, the identification data management system is configured for receiving the fourth signal from the authentication device reader and extracting the extracted unique identifier from the fourth signal. As depicted in step 516, the identification data management system is configured for matching the extracted unique identifier with the plurality of stored unique identifiers and step 518 depicts deactivating the authentication device corresponding to the at least one matched stored unique identifier, wherein the deactivation is performed by modifying the corresponding validity status indicator, if a match is found between the extracted unique identifier and at least one stored unique identifier.

What is claimed is:

1. A security system comprising:
an authentication device configured to transmit a second signal to deactivate the authentication device in response to receiving a first signal by the authentication device, wherein the second signal includes a unique identifier associated with the authentication device and wherein the first signal is received from an object external to the authentication device and the second signal is sent to a location remote from the authentication device;
an authentication device reader configured to extract the unique identifier from the second signal and to store the unique identifier and a validity status indicator associated with the unique identifier; and
wherein the validity status indicator is set to be invalid responsive to the second signal, wherein the authentication device is deactivated and no transaction is allowed when identified as invalid by the validity status indicator.

2. The security system of claim 1, wherein the authentication device is selected from the group consisting of: an electronic credit card, an electronic debit card, an electronic financial card, and an electronic identification card.

3. The security system of claim 1, wherein the second signal is a wireless signal and is selected from the group consisting of: a radio frequency identification signal, an optical signal, an audio signal, a magnetic signal, an electromagnetic signal, and an infra-red signal.

4. The security system of claim 1, further comprising the authentication device comprising:
a receiver configured to receive the first signal, and transmit an input signal to an activation device;
the activation device configured to receive the input signal; and produce an activation signal;
a power source configured to provide energy to the activation device; and
a transmitter configured to receive the activation signal from the activation device, and transmit the second signal to deactivate the authentication device.

5. The security system of claim 4, wherein the receiver is selected from the group consisting of: a touchpad, a button, an impact transducer, and a keypad; and the transmitter is at least one selected from an antenna and a signal generator.

6. The security system of claim 4, wherein the activation device is selected from a set comprising a microprocessor, an integrated circuit, and a processor.

7. The security system of claim 4, wherein the power source in communication with the activation device is selected from the group consisting of: a battery, a solar powered source, a motion based power source, and a piezoelectric source.

8. A security system comprising:
an authentication device configured to transmit a second signal to deactivate the authentication device in response to receiving a first signal by the authentication device, wherein the second signal includes a unique identifier corresponding to the authentication device, the authentication device comprising:
a receiver configured to transmit an input signal to an activation device responsive to the first signal;
the activation device configured to produce an activation signal in response to the input signal;
a transmitter configured to transmit the second signal to deactivate the authentication device;
an authentication device reader configured to extract the unique identifier from the second signal and to store the unique identifier and a validity status indicator associated with the unique identifier; and
wherein the validity status indicator is set to be invalid responsive to the second signal and the authentication device is deactivated and prevented no transaction is allowed when identified as invalid by the validity status indicator.

9. The security system of claim 8, wherein the authentication device reader is further configured to receive a communication from a user to abandon transmission of the extracted unique identifier in response to receipt of the communication.

10. The security system of claim 8, wherein an identification data management system is configured to receive the extracted unique identifier from the authentication device reader and to match the extracted unique identifier with a plurality of stored unique identifiers.

11. The security system of claim 10, wherein the identification data management system is further configured to deactivate the authentication device corresponding to at least one matched stored unique identifier, and wherein the deactivation is performed by modifying the corresponding validity status indicator in response to a match found between the extracted unique identifier and at least one stored unique identifier.

12. The security system of claim 10, wherein the identification data management system is further configured to:
- store at least one secondary stored unique identifier corresponding to the at least one stored unique identifier, wherein the at least one secondary stored unique identifier corresponds to a secondary authentication device;
- store a secondary validity status indicator corresponding to each of the secondary stored unique identifiers; and
- in response to a match between the extracted unique identifier and the at least one stored unique identifier:
  - identify the at least one secondary stored unique identifier associated with the at least one matched stored unique identifier; and
  - deactivate the at least one secondary authentication device, wherein the deactivation is performed by modifying the secondary validity status indicator corresponding to the at least one matched secondary stored unique identifier.

13. A method of securing an authentication device, the method comprising:
- transmitting a second signal to deactivate the authentication device in response to receiving a first signal, wherein the transmitting is performed by the authentication device, and wherein the authentication device includes a receiver, a transmitter, an activation device, and a power source, and wherein the second signal includes a unique identifier of the authentication device;
- an authentication device reader, communicatively coupled to the authentication device, wherein the authentication device reader is configured for receiving the second signal from the authentication device;
- extracting the unique identifier from the second signal and transmitting the extracted unique identifier; and an identification data management system, communicatively coupled to the authentication device reader, wherein the identification data management system is configured for:
  - storing a plurality of stored unique identifiers corresponding to a plurality of authentication devices;
  - storing a plurality of validity status indicators corresponding to the plurality of stored unique identifiers;
  - validating a transaction of the at least one authentication device in response to a combination of the corresponding stored unique identifier and the corresponding validity status indicator;
  - receiving the extracted unique identifier from the authentication device reader;
  - matching the extracted unique identifier with the plurality of stored unique identifiers; and
  - deactivating the authentication device corresponding to the at least one matched stored unique identifier, wherein the deactivation is performed by modifying the corresponding validity status indicator, if a match is found between the extracted unique identifier and at least one stored unique identifier, wherein no transaction is allowed when the authentication device is identified as invalid.

* * * * *